United States Patent
Abhari et al.

(10) Patent No.: US 9,247,404 B2
(45) Date of Patent: Jan. 26, 2016

(54) DELIVERY OF ADVERTISEMENTS OVER VOICE NETWORK

(75) Inventors: Omar Abhari, Oak Forest, IL (US); Omar Aqel, Orland Park, IL (US)

(73) Assignee: PlatinumTel Communications, LLC, Justice, IL (US)

( * ) Notice: Subject to any disclaimer, the term of this patent is extended or adjusted under 35 U.S.C. 154(b) by 250 days.

(21) Appl. No.: 13/024,267

(22) Filed: Feb. 9, 2011

(65) Prior Publication Data

US 2012/0202469 A1    Aug. 9, 2012

(51) Int. Cl.
| | |
|---|---|
| H04L 12/58 | (2006.01) |
| H04M 1/725 | (2006.01) |
| H04M 3/493 | (2006.01) |
| H04W 4/00 | (2009.01) |
| H04W 4/20 | (2009.01) |
| G06Q 30/02 | (2012.01) |

(52) U.S. Cl.
CPC ........... *H04W 4/206* (2013.01); *G06Q 30/0241* (2013.01)

(58) Field of Classification Search
CPC .............. H04L 29/08108; H04M 2207/18; H04M 3/4878; H04M 15/00; H04M 2215/0192; H04M 3/42017; H04W 4/02; G06Q 30/02
USPC ............... 455/414.1, 67.1, 412.1, 435, 456.1, 455/414.2, 435.1; 705/14; 379/114.13, 379/142.17, 67.1; 370/351, 352
See application file for complete search history.

(56) References Cited

U.S. PATENT DOCUMENTS

| | | | | |
|---|---|---|---|---|
| 6,885,861 | B2 * | 4/2005 | Koskelainen | H04W 24/04 455/414.2 |
| 6,937,699 | B1 * | 8/2005 | Schuster | G06Q 30/02 379/67.1 |
| 6,952,469 | B2 * | 10/2005 | Han | H04M 3/4878 379/142.13 |
| 7,149,522 | B2 * | 12/2006 | Koskelainen | H04W 24/04 379/142.12 |
| 7,697,673 | B2 * | 4/2010 | Chiu | H04M 3/4938 379/114.13 |
| 7,965,699 | B1 * | 6/2011 | Accardi | H04L 67/1002 370/351 |
| 8,045,687 | B2 * | 10/2011 | Ueshima | 379/114.13 |
| 8,121,897 | B2 * | 2/2012 | Shu | G06Q 10/0637 379/179 |
| 8,239,521 | B2 * | 8/2012 | Curcio | H04L 12/5695 370/348 |
| 8,244,289 | B2 * | 8/2012 | Shigeta | H04M 1/57 455/412.1 |
| 8,489,083 | B2 * | 7/2013 | Lim | H04M 1/72544 455/403 |
| 8,660,245 | B2 * | 2/2014 | Gupta | H04M 3/42017 379/100.04 |

(Continued)

FOREIGN PATENT DOCUMENTS

WO    WO 2010/103537    *  9/2010

*Primary Examiner* — William D Cumming
(74) *Attorney, Agent, or Firm* — Richards Patent Law P.C.

(57) ABSTRACT

A system and method to deliver a voice advertisement to a cellular device over a cellular telecommunication network prior to connection of a voice call. The system, within a cellular telecommunications network, includes two units, a first unit that determines whether a call is subscribed to receive an advertisement and makes a request for delivery of the advertisement before connecting the call, and a second unit that delivers the advertisement to the cellular device. First, the first unit identifies if the call is subscribed for delivery of an advertisement. Second, the first unit routes a request to the second unit for delivery of the advertisement. Third, the second unit delivers the advertisement to the cellular device. Fourth, the first unit connects the call to the network.

12 Claims, 2 Drawing Sheets

(56) References Cited

U.S. PATENT DOCUMENTS

| | | | |
|---|---|---|---|
| 2002/0025798 A1* | 2/2002 | Titmuss | H04Q 3/0029 455/412.1 |
| 2003/0040280 A1* | 2/2003 | Koskelainen | H04W 24/04 455/67.11 |
| 2003/0050837 A1* | 3/2003 | Kim | G06Q 30/0222 705/14.23 |
| 2004/0066776 A1* | 4/2004 | Ishidoshiro | H04H 20/81 370/352 |
| 2005/0111441 A1* | 5/2005 | Koskelainen | H04W 24/04 370/352 |
| 2007/0060306 A1* | 3/2007 | Amaitis | G07F 17/32 463/25 |
| 2007/0226061 A1* | 9/2007 | Chen | G06Q 10/0637 705/14.19 |
| 2008/0119168 A1* | 5/2008 | Farkas | G06Q 30/02 455/412.1 |
| 2008/0288354 A1* | 11/2008 | Flinn et al. | 705/14 |
| 2012/0035993 A1* | 2/2012 | Nangia | G06Q 30/02 705/14.4 |

* cited by examiner

DELIVERY OF ADVERTISEMENTS OVER VOICE NETWORK

BACKGROUND OF THE INVENTION

The present subject matter relates to delivery of advertisements to a cellular device over a cellular telecommunications network. More specifically, the present invention relates to a system for delivering advertisements to a device prior to connecting a voice service call and without the use of specialized equipment or auxiliary devices to facilitate the delivery. Such a system may be implemented to reduce the overall cost of service for users of cellular telecommunication devices.

Traditionally, the cost for cellular telecommunication service has been high, especially in the United States, placing such service out of the reach of many people. The high cost still remains if not increased by the cost to obtain new devices compatible with a provider's technology and system, which is not always the same as other providers' systems. Additionally, over the past few years, cellular telecommunications providers have experienced a decline in the average rate per user (ARPU) for voice service over cellular telecommunications networks. The decline can be attributed to the increase in use of data service (i.e., Short Messaging System (SMS) and Multimedia Messaging System (MMS)) over the same network.

Service providers have attempted to alleviate these problems seeking ways to reduce the cost for voice service to attract more customers and increase revenue. For many years, providers have offered devices at little or no cost with the requirement to sign a long-term contract, which for many people translates to an additional or higher cost for service given the early termination fee and length of financial commitment. Moreover, providers have offered more affordable service but the reduction in cost has been incremental and has extended to those customers who are willing to commit to higher monthly plans, requiring higher usage of the service. This provides a lower unit cost based on usage however the aggregate cost of plan still makes the service unaffordable and undesirable to those who are unable to reach a high usage rate that would make the financial commitment worthwhile. Providers have offered a special bundle services combining both voice and data to attract customers to larger voice plans based on the cost for favorable data service. Again, these solutions only attract certain customers and do not reduce the cost for all customers.

Recently, the development of prepaid cellular services and plans has attracted more customers, providing them with an option to receive cellular service at a lower rate as needed and without special features. With this solution, providers have achieved higher levels of usage rate in some demographical groups, but not all. However, many customers forgo cellular service for non-cellular telecommunication service, which is predominant and very affordable.

Providers have also turned to advertising on cellular devices to increase revenue and gain more customers. The more common advertising systems have been implemented through SMS and mobile internet/Wireless Access Protocol (WAP), where advertisements are distributed through videos, text messages, search and banner displays. Systems have also been implemented where advertising is tied to the voice service on a cellular network however these implementations require the use of special equipment or auxiliary devices for delivery. Although the advertisement generates additional revenue and provides a voice message directly to the customer, these previous attempts suffer because the overall cost to the customer is often not reduced due to the need for special equipment or devices. Thus, prior solutions have fallen short.

Accordingly, there is a need for a system that enables the delivery of advertisements to the user of a cellular device without the need for a specialized cellular device or other specialized equipment.

BRIEF SUMMARY OF THE INVENTION

The subject matter provided herein addresses these issues by providing a method and a system for delivering advertisements to a cellular telecommunication device over a cellular network prior to connecting a call. In addition, this system and method do not require the use of special equipment or auxiliary devices.

In one embodiment, the system and method for delivering advertisements to a cellular telecommunication device over a cellular telecommunication network include a cellular telecommunication network that includes an Advertising Identification Unit (AIU) and an Advertising Delivery Unit (ADU). In use, a voice call is placed from a cellular device over the network. The placing of the call triggers a request to the AIU before the call is connected. The AIU determines whether the cellular device that placed the call is subscribed to receive audio advertisements prior to connection of the call. The AIU accesses an associated database to retrieve the device's subscription status to identify whether the call requires delivery of an advertisement. If the cellular device is subscribed to receive advertisements, the AIU routes a request to the ADU to deliver an audio advertisement to the cellular device. The ADU delivers an advertisement to the cellular device upon receiving the request. After delivery of the advertisement, the AIU places the call to the network for connection.

As an example, the system and method may be implemented in a cellular telecommunication network utilizing Intelligent Network (IN) architecture. The IN provides additional services supported by at least one Service Control Point (SCP), which provides a query and retrieval service to access customer information (i.e., preferences, profile) from the associated database. The SCP functions as the AIU, identifying whether the cellular device is subscribed to receive an advertisement, and routing the call to the ADU to deliver the advertisement to the cellular device.

The ADU is embodied in a Voice Response Unit (VRU), which handles the delivery of the advertisement. The VRU delivers the advertisement to the cellular device via a voice channel in the cellular network. Upon delivery, the AIU recaptures the call from the VRU, and returns it to the network for connection.

It is therefore an advantage of the system for advertisement over a cellular telecommunication network provided herein to deliver advertisements to a cellular device prior to connecting a voice service request.

It is yet another advantage of the system for advertisement over a cellular telecommunication network provided herein to increase advertising distribution by increasing the available channels of distribution and the frequency at which advertisements reach the public, by delivery through voice service.

Further, it is an advantage of the system for advertisement over a cellular telecommunication network provided herein to reduce the need for special equipment or auxiliary devices to deliver advertisements to a cellular device over a cellular telecommunication network prior to connection of voice service.

Still further, it is an advantage of the system for advertisement over a cellular telecommunication network provided herein to provide cellular service at a reduced or subsidized cost through delivery of voice advertisements.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
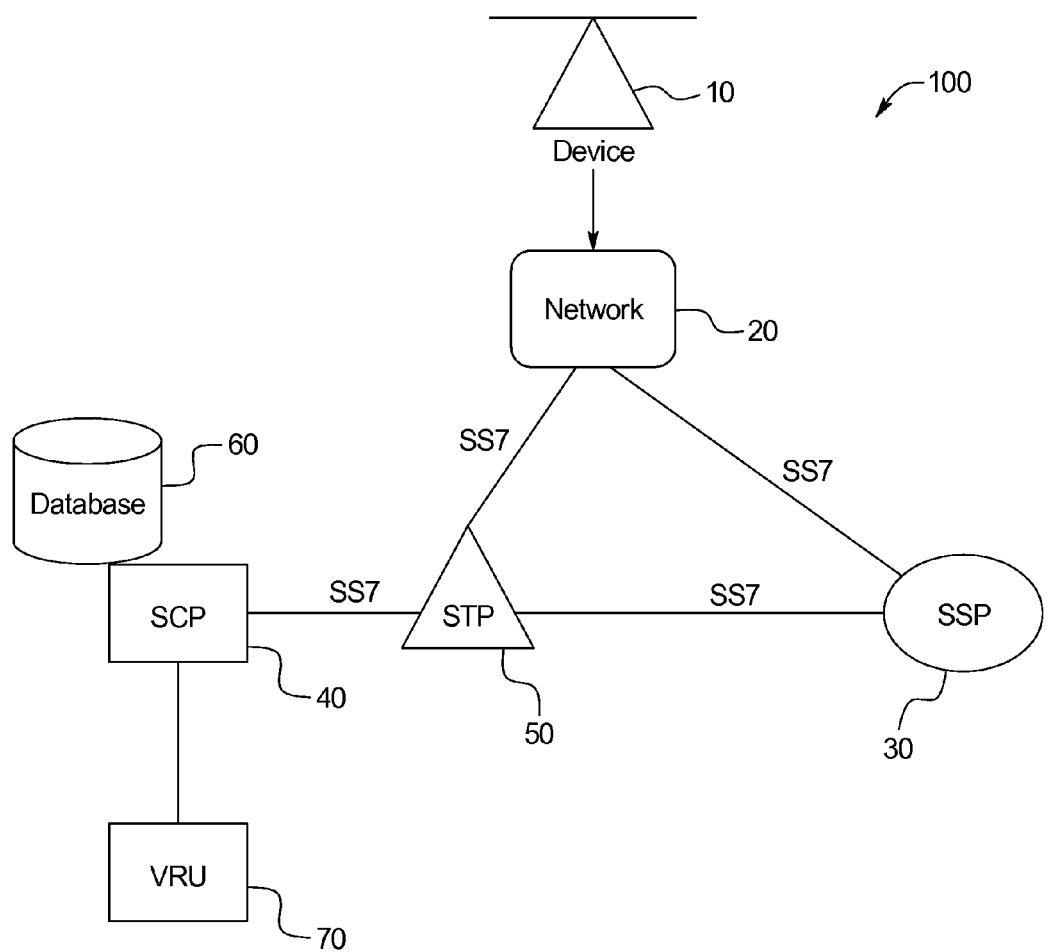
FIG. 1 is a general block diagram illustrating a cellular telecommunication system wherein a preferred embodiment of the invention is shown.

FIG. 1 illustrates a general block diagram of a cellular telecommunication system 100 for delivering an advertisement to a cellular telecommunication device 10 over a network 20 prior to connecting a voice service request.

A cellular telecommunication device (device) 10 is connected to a cellular telecommunications network (network) 20 when the caller places a call using the device 10. The network 20 shown in FIG. 1 is implemented using an Intelligent Network (IN) architecture, though it is understood that the benefits of the subject matter disclosed herein may be realized using systems 100 implemented using alternative architecture.

The operation of a network implementing IN architecture is understood by those skilled in the art. As shown in FIG. 1, the network 20 includes a series of interconnected network elements, including at least one of each of the following, a Service Switching Point (SSP) 30, a Service Control Point (SCP) 40, and a Signal Transfer Point (STP) 50. As shown in FIG. 1, services provided in the network 20 may be facilitated through the SCP 40.

The SCP 40 contains service control logic that implements special functionality for the network 20. The SCP 40 is connected to a database 60 that stores customer and device data pertaining to subscription profiles and preferences. For example, the database 60 may include data identifying whether a device 10 is subscribed or enrolled to receive advertisements. Additionally, the database 60 may include demographic and/or preference information enabling advertisements to be appropriately targeted to the recipient. The network 20 requests the SCP 40 to perform services, such as accessing the database 60 to query and retrieve subscription information and customer demographic information. The SCP 40 contains logic to access device's 10 subscription status from the database 60 and to identify which calls are subscribed for delivery of advertisements. Furthermore, the SCP 40 is connected to the network 20 and the SSP 30 by the STP 50. The SSP 30 is located within a switching layer in the network 20 and handles the telecommunication connection requests for the network 20.

In the example shown in FIG. 1, the network communications protocol used for signaling and control between network elements is Signaling System Number 7 (SS7). SS7 is used to connect the IN elements, including the SSP 30, the SCP 40, and the STP 50, to the network 20. As shown in FIG. 1, the preferred embodiment of the IN has SS7 network connections forming a communication link between the network 20 and the SCP 40 and the SSP 30 via the STP 50. The STP 50 is a routing node that functions as a packet switch.

The "Advertisement Identification Unit" (AIU) is the unit that determines whether a device 10 on a cellular telecommunication network 20 is subscribed to advertisement service that requires delivery of advertisements before voice service is provided. The AIU is also responsible for routing a request for delivery of advertisement and recapturing the caller's connection request after the advertisement is delivered. The AIU is represented in this embodiment by the SCP 40; however, it is understood that in systems 100 utilizing alternative architecture, the AIU may be embodied by one or more other elements. Upon connection of the call, the network 20 requests, via SS7, the SCP 40 to identify the device's 10 subscription status to identify whether the call requires delivery of advertisements before connecting the voice service. The SCP 40, which contains control logic to access the database 60, accesses the database 60 to retrieve the device's 10 subscription status to determine whether the call is subscribed to receive delivery of advertisements. The SCP 40 identifies the call if the associated device 10 is subscribed for advertisement delivery. When a device 10 is identified as being subscribed for delivery of advertisements, the SCP 40 routes a request for delivery of advertisement to the Voice Response Unit (VRU) 70.

The "Advertising Delivery Unit" (ADU) is the unit delivers the advertisement when requested to do so by the AIU. In the embodiment shown in FIG. 1, the ADU is represented by the VRU 70. The VRU 70 selects an advertisement for delivery to the device 10 based on instructions received via the SCP 40. The instructions may be based on the profile, device preferences or other demographics associated with the device 10. The advertisement may be, for example, a pre-recorded audio message that is accessible by the VRU 70. The VRU 70 delivers the voice advertisement to the device 10 utilizing the voice channel in the network 20. Upon completion of the message, the requesting SCP 40 will recapture the device's 10 connection request from the VRU 70 and return control to the network 20. The network 20 connects the call by passing the request on to the SSP 30.

Figure 2:
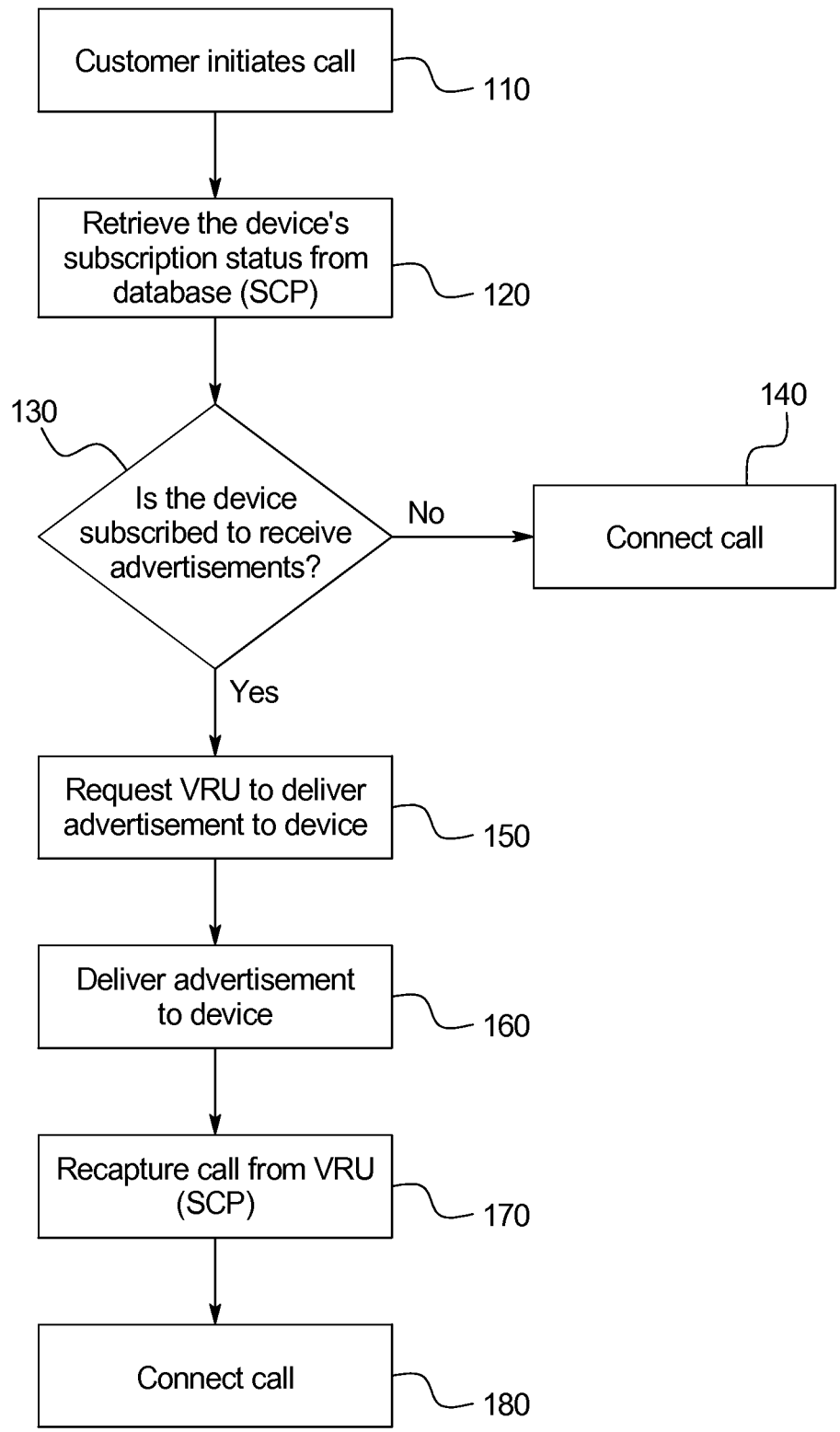
FIG. 2 is a flow diagram illustrating the operation of the advertisement delivery system of a preferred embodiment within the cellular telecommunication system shown in FIG. 1.

FIG. 2 is a flow diagram illustrating a method 200 for delivering an advertisement over a cellular telecommunications network 20. The method 200 may be implemented, for example, in conjunction with the system 100 embodied in and described with respect to FIG. 1.

Referring now to FIG. 2, a customer initiates a call (step 110) using a cellular telecommunication device 10 to connect to the cellular telecommunications network 20. The network 20 requests the SCP 40 to perform services to identify whether the call is subscribed to or enrolled for advertisement delivery. The SCP 40 accesses the database 60 to retrieve the customer's subscription status (step 120) to identify whether the device 10 initiating the voice call is subscribed for advertisement delivery (step 130).

At step 130, if the device 10 is not subscribed for advertisement delivery, then the SCP 40 returns control to the network 20 and the network 20 connects the call (step 140) by passing the request onto the SSP 30. If the device 10 is subscribed for advertisement delivery, then it is identified for delivery of advertisement. The SCP 40 routes a request for delivery of advertisement to the VRU 70 (step 150).

As described in FIG. 1, the VRU 70, which represents the ADU, delivers the voice advertisement to the device 10 utilizing the voice channel in the network 20. (step 160) Upon completion of the delivery, the SCP 40 recaptures the call from the VRU 70. (step 170) The SCP 40 then returns control to the network 20 and the network 20 connects the call (step 180) by passing the request on to the SSP 30.

While the examples provided above describe the various elements of the network 20 as distinct elements, it is understood that various combinations of elements described herein may be provided in a single element based on the architecture of the network 20 implemented.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An advertisement delivery system comprising:
    a service control point in communication with a database, wherein the database includes data identifying one or more cellular devices that are subscribed to receive advertisements;
    in response to a customer initiating a cellular call from a first cellular device to connect with a first connection, the service control point accesses the database and determines whether the first cellular device is subscribed to receive advertisements;
    when the first cellular device is subscribed to receive advertisements, the service control point routes the cellular call from the first cellular device to a voice response unit to receive the advertisement, and, only upon completion of the advertisement delivery, the service control point recaptures the cellular call from the voice response unit and connects the cellular call from the first cellular device to the first connection; and
    when the first cellular device is not subscribed to receive advertisements, the service control point connects the cellular call from the first cellular device to the first connection.

2. The system of claim 1 wherein the database further includes device preference information.

3. The system of claim 2 wherein the selection of an advertisement is based on the device preference information.

4. The system of claim 1 wherein the database further includes user demographic information.

5. The system of claim 4 wherein the selection of an advertisement is based on the user demographic information.

6. The system of claim 1 wherein the advertisement is an audible advertisement delivered through the cellular device's voice service.

7. An advertisement delivery method comprising:
    receiving, in a service control point, a cellular call request from a first cellular device to connect with a first connection, wherein the service control point is in communication with a database, wherein the database includes data identifying one or more cellular devices that are subscribed to receive advertisements; wherein the service control point is configured to:
    access the database to determine whether the first cellular device is subscribed for advertisement delivery;
    when the first cellular device is subscribed to receive advertisements, route the cellular call from the first cellular device to a voice response unit to receive the advertisement, and, only upon completion of the advertisement delivery, recapture the cellular call from the voice response unit and connect the cellular call from the first cellular device to the first connection; and
    when the first cellular device is not subscribed to receive advertisements, connect the cellular call from the first cellular device to the first connection.

8. The system of claim 7 wherein the database further includes device preference information.

9. The system of claim 8 wherein the selection of an advertisement is based on the device preference information.

10. The system of claim 7 wherein the database further includes user demographic information.

11. The system of claim 10 wherein the selection of an advertisement is based on the user demographic information.

12. The system of claim 7 wherein the advertisement is an audible advertisement delivered through the cellular device's voice service.

* * * * *